US007605550B2

(12) United States Patent
Ferentz et al.

(10) Patent No.: US 7,605,550 B2
(45) Date of Patent: Oct. 20, 2009

(54) CONTROLLED BLEEDER FOR POWER SUPPLY

(75) Inventors: Alon Ferentz, Bat Yam (IL); Roni Blaut, Netanya (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 72 days.

(21) Appl. No.: 11/772,249

(22) Filed: Jul. 2, 2007

(65) Prior Publication Data

US 2008/0048573 A1 Feb. 28, 2008

Related U.S. Application Data

(60) Provisional application No. 60/807,503, filed on Jul. 17, 2006.

(51) Int. Cl.
*H05B 37/00* (2006.01)
*G06F 3/38* (2006.01)

(52) U.S. Cl. ...................................... 315/312; 345/204

(58) Field of Classification Search ................. 315/291, 315/77, 82, 312; 345/204, 82
See application file for complete search history.

(56) References Cited

U.S. PATENT DOCUMENTS

| | | | | |
|---|---|---|---|---|
| 6,088,209 | A | 7/2000 | Sink | |
| 6,153,980 | A | 11/2000 | Marshall et al. | |
| 6,808,287 | B2 * | 10/2004 | Lebens et al. | 362/184 |
| 6,909,249 | B2 * | 6/2005 | Otake | 315/291 |
| 2004/0066143 | A1 * | 4/2004 | Ito et al. | 315/77 |
| 2004/0251854 | A1 * | 12/2004 | Matsuda et al. | 315/291 |
| 2006/0082529 | A1 * | 4/2006 | Oyama | 345/82 |
| 2006/0125773 | A1 * | 6/2006 | Ichikawa et al. | 345/102 |
| 2006/0145636 | A1 * | 7/2006 | Bacon et al. | 315/312 |

* cited by examiner

*Primary Examiner*—Douglas W Owens
*Assistant Examiner*—Minh D A
(74) *Attorney, Agent, or Firm*—Simon Kahn

(57) ABSTRACT

An LED backlighting system including: a control circuit; a power source; at least one LED string associated with the power source, the at least one LED string being arranged to be switchably connected to alternatively draw an illumination current from the power source and not draw an illumination current from the power source; and a controlled bleeder arranged to draw a bleed current from the power source responsive to the control circuit; the control circuit being operative to draw the bleed current from the power source via the controlled bleeder for a predetermined time period associated with the alternatively drawing and not drawing the illumination current of the at least one LED string.

28 Claims, 5 Drawing Sheets

CONTROLLED BLEEDER FOR POWER SUPPLY

CROSS-REFERENCE TO RELATED APPLICATIONS

This application claims priority from U.S. Provisional Patent Application Ser. No. 60/807,503 to Ferentz et al, filed Jul. 17, 2006 and entitled "CONTROLLED BLEEDER FOR POWER SUPPLY", the entire contents of which is incorporated herein by reference.

BACKGROUND OF THE INVENTION

The present invention relates to the field of power supplies for light emitting diode based backlighting and more particularly to a controlled bleeder timed to absorb and or limit any power supply ringing.

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a monitor. In a large LCD monitor typically the LEDs are supplied in one or more strings of serially connected LEDs, thus sharing a common current.

In order supply a white backlight for the monitor one of two basic techniques are commonly used. In a first technique one or more strings of "white" LEDs are utilized, the white LEDs typically comprising a blue LED with a phosphor which absorbs the blue light emitted by the LED and emits a white light. In a second technique one or more individual strings of colored LEDs are placed in proximity so that in combination their light is seen a white light. Often, two strings of green LEDs are utilized to balance one string each of red and blue LEDs.

In either of the two techniques, the strings of LEDs are in one embodiment located at one end or one side of the monitor, the light being diffused to appear behind the LCD by a diffuser. In another embodiment the LEDs are located directly behind the LCD, the light being diffused so as to avoid hot spots by a diffuser. In the case of colored LEDs, a further mixer is required, which may be part of the diffuser, to ensure that the light of the colored LEDs are not viewed separately, but are rather mixed to give a white light. The white point of the light is an important factor to control, and much effort in design and manufacturing is centered on the need for a correct white point.

Each of the colored LED strings is typically intensity controlled by both amplitude modulation (AM) and pulse width modulation (PWM) to achieve an overall fixed perceived luminance. AM is typically used to set the white point produced by the disparate colored LED strings by setting the constant current flow through the LED string to a value achieved as part of a white point calibration process. PWM is typically used to variably control the overall luminance, or brightness, of the monitor without affecting the white point balance. Thus the current, when pulsed on, is held constant to maintain the white point among the disparate colored LED strings, and the PWM duty cycle is controlled to dim or brighten the backlight by adjusting the average current. The PWM duty cycle of each color is further modified to maintain the white point, preferably responsive to a color sensor. It is to be noted that different colored LEDs age, or reduce their luminance as a function of current, at different rates and thus the PWM duty cycle of each color must be modified over time to maintain the white point.

Each of the disparate colored LED strings has a voltage requirement associated with the forward voltage drop of the constituent LEDs and the number of LEDs in the LED string. In the event that multiple LED strings of each color are used, the voltage drop across strings of the same color having the same number of LEDs per string may also vary, due to manufacturing tolerances and temperature differences. Ideally, separate power sources are supplied for each LED string, the power sources being adapted to adjust their voltage output to be in line with voltage drop across the associated LED string. Such a large plurality of power sources effectively minimizes excess power dissipation however the requirement for a large plurality of power sources is costly.

An alternative solution, which reduces the number of power sources required, is to supply a single power source for each color. Thus a plurality of LED strings of a single color is driven by a single power source, and the number of power sources required is reduced to the number of different colors, i.e. typically to 3. Unfortunately, since as indicated above different LED strings of the same color may exhibit different voltage drops, such a solution further requires an active element in series with each LED string to compensate for the difference among the respective voltage drops so as to ensure an essentially equal current through each of the LED strings of the same color. The LED string voltage drop is not a constant, as in particular the individual LED voltage drop changes as the LEDs age. Furthermore, the voltage drops of the LEDs of the LED strings are a function of temperature, and thus the voltage output of the power source must be set high enough so as to supply sufficient voltage over the operational life of the LED strings.

As explained above, each of the LED strings are pulse width modulated, i.e. the strings are individually switched between a conducting state in which the LEDs illuminate and a non-conducting stage in which the LEDs do not illuminate, and thus the power source experiences widely disparate rapidly changing demands. In a typical embodiment the LED strings are pulse width modulated via a simple FET which is turned on and off, and thus the current for each LED string is nearly instantaneously switched between the nominal LED string current and zero current. Ideally, the power source used should have a high frequency response, and thus be capable of supporting the rapidly changing load, but unfortunately this is costly. The power source may be constituted of a switching power source, having therein a PWM component independent of the PWM control of the LED string.

FIG. 1 illustrates a high level schematic diagram of an LED backlighting system 10 comprising: a power source, illustrated as switching power supply 20 associated with a single LED string 30 connected in series with an FET 40 and a sense resistor 50. FET 40 is switched from a conducting state to a non-conducting state thereby pulse width modulating LED string 30. FIG. 2A illustrates the desired output current of power supply 20, with the y-axis representing current drawn from power supply 20 and the x-axis representing time. Power supply 20 experiences a load condition 100 when FET 40 is in a conducting state and a no-load condition 90 when FET 40 is a non-conducting state. The output current of power supply 20 thus exhibits a near zero current during the no-load condition 90 when FET 40 is in a non-conducting state, and a high output during load condition 100 when FET 40 is in a conducting state thereby enabling a current draw by LED string 30.

FIG. 2B illustrates the output voltage of power supply 20 in the event that power supply 20 does not exhibit a sufficiently high frequency response, with the y-axis representing output voltage of power supply 20 and the x-axis representing time. The x-axis is in 1:1 correspondence with the x-axis of FIG. 2A. The voltage output of power supply 20 exhibits a ringing component 120 with consequent overshoot and undershoot at the beginning of the load condition 100, and similarly exhibits ringing 130 at the beginning of the no-load condition 90. FIG. 2C illustrates the resultant output voltage of power supply 20 associated with the waveform shown in FIG. 2B. FIG. 2D illustrates the resultant output current of power supply 20 associated with the waveform shown in FIG. 2B. The output current of power supply 20 exhibits a ringing component 140 including overshoot and undershoot at the beginning of load condition 100.

Since for each power supply there are typically a plurality of LED strings, ideally the PWM cycle for each of the LED strings is distributed so that the power supply does not experience a no-load condition, and therefore the ringing is minimized. Unfortunately, this puts an additional limitation on the PWM timing control, and may not always achievable. To the extent a current overshoot may occur, the overshoot must be taken into account in specifying the power supply. Furthermore, in the event that the control for the LED strings samples the amount of current flowing through each LED string, care must be taken to ensure that a sample is not obtained during the ringing, as such a sample may not be representative of the actual current flow.

What is needed, and not provided by the prior art, is a means for controlling or limiting the ringing associated with a power supply experiencing near instantaneous changes in current flow.

SUMMARY OF THE INVENTION

Accordingly, it is a principal object of the present invention to overcome the disadvantages of prior art. This is provided in the present invention by a controlled bleeder associated with each power source. In one embodiment the controlled bleeder comprises an impedance arranged to be controllably switched to present a load to the power source, and in an other embodiment the controlled bleeder comprises a current source arranged to be controllably draw a pre-selected current from the power source. In an exemplary embodiment the controlled bleeder is switched to draw current just prior to enabling one or more LED strings so as to absorb any ringing from the power supply. Thus, the LED strings experience more stable power when connected to draw power.

In one embodiment the controlled bleeder is switched to draw current only when none of the connected LED strings are enabled, and only for a predetermined time period just prior to enabling one or more LED strings. In another embodiment the controlled bleeder is switched to draw current just prior to enabling at least one LED string. Preferably the controlled bleeder is switched to not draw current contemporaneously with the at least one LED string being enabled.

In another embodiment the controlled bleeder is operative to provide one of a plurality of current levels. In yet another embodiment the controlled bleeder exhibits a time dependent current draw which acts to reduce ringing. Reduced ringing is advantageous to reduce electromagnetic interference as well as to provide a stable current for the LED string. In yet another embodiment the controlled bleeder is operated during any large shift in current draw so as to reduce ringing.

The invention provides for an LED backlighting system comprising: a control circuit; a power source; at least one LED string associated with the power source, the at least one LED string being arranged to be switchably connected to alternatively draw current from the power source and not draw current from the power source; and a controlled bleeder arranged to draw a bleed current from the power source responsive to the control circuit; the control circuit being operative to draw the bleed current from the power source via the controlled bleeder for a predetermined time period associated with the alternatively draw, and not draw, current of the at least one LED string.

In one embodiment the predetermined time period comprises a period wherein the at least one LED string is not switchably connected to draw current from the power source. In another embodiment the predetermined time period comprises a period wherein the at least one LED string is not switchably connected to draw current from the power source, the predetermined time period ending substantially contemporaneously with the at least one LED string being switchably connected to draw current from the power source. In yet another embodiment the control circuit is operative, responsive to an output of the power source indicative of an unstable output, to draw the bleed current.

In one embodiment the controlled bleeder comprises one of an impedance and a current source. In another embodiment the control circuit is further operative to not draw the bleed current when the at least one LED string is switchably connected to draw current from the power source.

In one embodiment the controlled bleeder is arranged to draw one of a plurality of pre-determined levels of bleed current from the power source. In another embodiment the controlled bleeder is arranged to draw an adjustable amount of bleed current from the power source.

In one embodiment the controlled bleeder is arranged to draw a pre-determined bleed current from the power source. In another embodiment the control circuit is operative to draw a time dependent amount of bleed current, and wherein the time dependent amount of bleed current is operative to reduce electromagnetic interference. In yet another embodiment the control circuit is operative to draw the bleed current prior to the at least one LED string being switchably connected to draw current, wherein the drawn bleed current reduces ringing experienced by the at least one LED string.

In one embodiment the at least one LED string comprises a plurality of LED strings, and wherein each of the plurality of LED strings is switchably connected responsive to the control circuit, the control circuit being operative to draw the bleed current when none of the plurality of LED strings are switchably connected to draw current. In one further embodiment the control circuit is further operative to disable the bleed current when at least one of the plurality of LED strings is switchably connected to draw current. In another further embodiment the pre-determined time period is just prior to at least one of the plurality of LED strings being switchably connected to draw current, the pre-determined time period being sufficient to absorb ringing.

In one embodiment the control circuit is operative to adjustably draw the bleed current, the pre-determined time period being prior to the at least one LED string being switchably connected to draw current, the pre-determined time period being sufficient to absorb ringing.

The invention independently provides for a method for LED backlighting comprising: providing a power source; providing at least one LED string associated with the power source; alternatively drawing current from the power source via the provided at least one LED string and not drawing current from the power source via the provided at least one LED string; and drawing a bleed current from the power source for a predetermined time period associated with the alternatively drawing and not drawing current.

In one embodiment the predetermined time period comprises a period wherein the provided at least one LED string is not drawing current from the power source. In another embodiment the predetermined time period comprises a period wherein the provided at least one LED string is not drawing current from the power source, the predetermined time period ending substantially contemporaneously with the at least one LED string drawing current from the power source.

In one embodiment the method further comprises outputting a signal from the power source indicative of an unstable output, wherein the drawing a bleed current is responsive to the output signal. In another embodiment the method further comprises providing one of an impedance and a current source, the drawing a bleed current being associated with the provided one of an impedance and a current source. In yet another embodiment the method further comprises not drawing a bleed current when the provided at least one LED string is drawing current from the power source.

In one embodiment the bleed current is selected from a plurality of pre-determined levels of current. In another embodiment the bleed current is of an adjustable amount. In another embodiment the bleed current is a pre-determined amount of current. In yet another embodiment the bleed current is of a time adjustable amount, the time adjustable amount reducing electromagnetic interference. In yet another embodiment the drawing of the bleed current is just prior to the drawing current from the power source via the provided at least one LED string, and wherein the bleed current reduces ringing of the drawn current.

In one embodiment the provided at least one LED string comprises a plurality of LED strings, and wherein the drawing the bleed current is at least partially contemporaneous with none of the provided plurality of LED strings drawing current from the power source. In another embodiment the drawing of the bleed current is for a pre-determined time period prior to the drawing current via the provided at least one LED string, the pre-determined time period being sufficient to absorb ringing.

In one embodiment the provided at least one LED string comprises a plurality of LED strings, wherein the drawing of the bleed current is at least partially contemporaneous with none of the provided plurality of LED strings being drawing current from the power source, and wherein the drawing the bleed current is for a pre-determined time period prior to at least one of the provided plurality of LED strings drawing current, the predetermined time period being sufficient to absorb ringing.

The invention independently provides for an LED backlighting system comprising: a control circuit; a power source; at least one LED string associated with the power source, the at least one LED string being arranged to be switchably connected to alternatively draw an illumination current from the power source and not draw an illumination current from the power source; and a means for controlled bleeding of current from the power source responsive to the control circuit, the control circuit being operative to draw a bleed current from the power source via the means for controlled bleeding when the at least one LED string is not drawing the illumination current from the power source.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
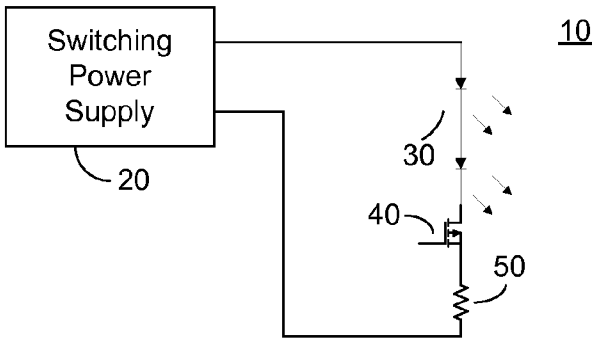
Fig. 1 (Prior Art)
FIG. 1 illustrates a illustrates a high level schematic diagram of an LED backlighting system according to the prior art.
Figure 2A:
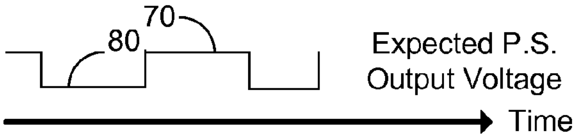
Fig. 2A (Prior Art)
FIG. 2A illustrates the desired output current of the power source of FIG. 1.
Figure 2B:
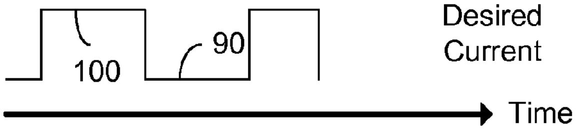
Fig. 2B (Prior Art)
FIG. 2B illustrates the actual output voltage of the power source of FIG. 1.
Figure 2C:
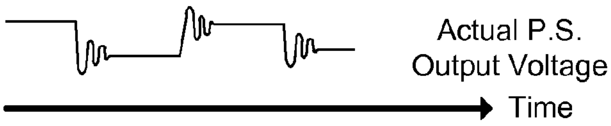
Fig. 2C (Prior Art)
FIG. 2C illustrates the actual output voltage of the power source of FIG. 1.
Figure 2D:
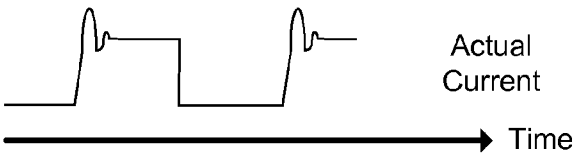
Fig. 2D (Prior Art)
FIG. 2D illustrates the actual output current of the power source of FIG. 1.

The present embodiments enable a controlled bleeder associated with each power source. In one embodiment the controlled bleeder comprises an impedance arranged to be controllably switched to present a load to the power source, and in an other embodiment the controlled bleeder comprises a current source arranged to be controllably draw a pre-selected current from the power source. The controlled bleeder is switched to draw current just prior to enabling one or more LED strings so as to absorb and ringing from the power supply. Thus, the LED strings experience more stable power when connected to draw power.

In one embodiment the controlled bleeder is switched to draw current only when none of the connected LED strings are enabled, and only for a predetermined time period just prior to enabling one or more LED strings. In another embodiment the controlled bleeder is switched to draw current just prior to enabling at least one LED string. Preferably the controlled bleeder is switched to not draw current contemporaneously with the at least one LED string being enabled.

In another embodiment the controlled bleeder is operative to provide one of a plurality of current levels. In yet another embodiment the controlled bleeder exhibits a time dependent current draw which acts to reduce ringing. Reduced ringing is advantageous to reduce electromagnetic interference as well as to provide a stable current for the LED string. In yet another embodiment the controlled bleeder is operated during any large shift in current draw so as to reduce ringing.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3A:
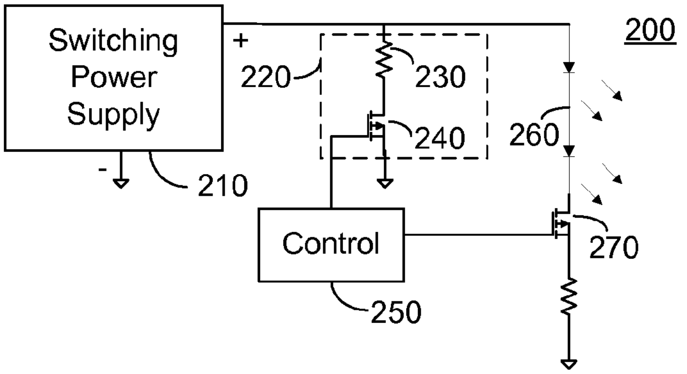
FIG. 3A illustrates a high level functional block diagram of an LED backlighting system exhibiting a controlled bleeder in accordance with a principle of the invention, comprising an impedance.

FIG. 3A illustrates a high level functional block diagram of an LED backlighting system 200 exhibiting a controlled bleeder in accordance with a principle of the invention, comprising an impedance. Backlighting system 200 comprises: a power source illustrated as a switching power supply 210; a controlled bleeder 220 comprising an impedance 230 and an electronically controlled switch 240 illustrated as an FET; a control circuit 250; at least one LED string 260 and an electronically controlled switch 270. A first end of impedance 230 is connected to the positive output of switching power supply 210, and a second end of impedance 230 is connected to the drain of electronically switch 240. The gate of electronically controlled switch 240 is connected to an output of control 250 and the source of electronically controlled switch 240 is connected to the return of switching power supply 210. Thus, controlled bleeder 220 is arranged to be switchably connected responsive to control circuit 250 across the output of switching power supply 210.

The anode end of LED string 260 is connected to the positive output of switching power supply 210 and the cathode end of LED string 260 is connected to the drain of electronically controlled switch 270. The gate of electronically controlled switch 270 is connected to an output of control 250 and the source of electronically controlled switch 270 is connected via an impedance or resistance to the return of switching power supply 210. Thus, LED string 260 is arranged to receive the output of power supply 210 and to conduct under control of electronically controlled switch 270. A single LED string 260 is illustrated connected to switching power supply 210 however this is not meant to be limiting in any way and in a typical embodiment a plurality of LED strings 260 are connected to switching power supply 210 in parallel.

In operation control 250 is operational to draw current via controlled bleeder 220 for a predetermined time associated with the turn on and turn off of current through LED string 260 via electronically controlled switch 270. In one embodiment control 250 is operational to draw current via controlled bleeder 220 for a predetermined time just prior to the turn on of LED string 260 via electronically controlled switch 270. Thus, ringing resulting from switching power supply 210 changing from a no-load condition associated with LED string 260 not conducting to a loaded condition associated with LED string 260 conducting is absorbed by controlled bleeder 220 and is substantially absent from the current of LED string 260. In another embodiment control 250 is operational to draw a time dependent amount of current via controlled bleeder 220, the sloped draw of current further reducing electromagnetic interference. Control 250 may be operational to draw a plurality of current levels through controlled bleeder 220 or an adjustable amount of current without exceeding the scope of the invention.

Figure 3B:
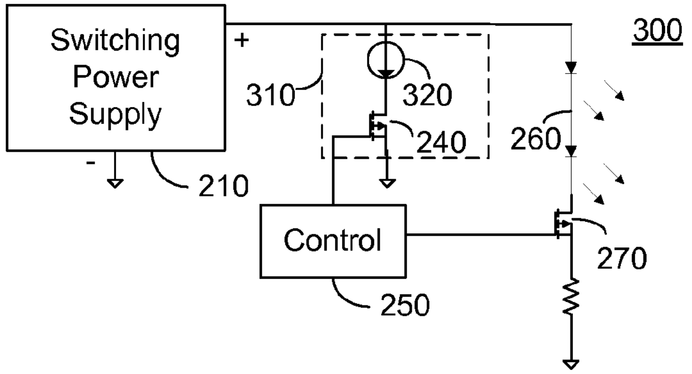
FIG. 3B illustrates a high level functional block diagram of an LED backlighting system exhibiting a controlled bleeder in accordance with a principle of the invention, comprising a current source.

FIG. 3B illustrates a high level functional block diagram of an LED backlighting system 300 exhibiting a controlled bleeder comprising a current source in accordance with a principle of the invention. Backlighting system 300 comprises: a power source illustrated as a switching power supply 210; a controlled bleeder 310 comprising a current source 320 and an electronically controlled switch 240 illustrated as an FET; a control circuit 250; at least one LED string 260 and an electronically controlled switch 270. A first end of current source 320 is connected to the positive output of switching power supply 210, and a second end of current source 320 is connected to the drain of electronically switch 240. The gate of electronically controlled switch 240 is connected to an output of control 250 and the source of electronically controlled switch 240 is connected to the return of switching power supply 210. Thus, controlled bleeder 310 is arranged to be switchably connected responsive to control circuit 250 across the output of switching power supply 210.

The anode end of LED string 260 is connected to the positive output of switching power supply 210 and the cathode end of LED string 260 is connected to the drain of electronically controlled switch 270. The gate of electronically controlled switch 270 is connected to an output of control 250 and the source of electronically controlled switch 270 is connected via an impedance or resistance to the return of switching power supply 210. Thus, LED string 260 is arranged to receive the output of power supply 210 and to conduct under control of electronically controlled switch 270. A single LED string 260 is illustrated connected to switching power supply 210 however this is not meant to be limiting in any way and in a typical embodiment a plurality of LED strings 260 are connected to switching power supply 210 in parallel.

In operation control 250 is operational to draw current via controlled bleeder 310 for a predetermined time associated with the turn on and turn off of current through LED string 260 via electronically controlled switch 270. In one embodiment control 250 is operational to draw current via controlled bleeder 310 for a predetermined time just prior to the turn on of LED string 260 via electronically controlled switch 270. Thus, ringing resulting from switching power supply 210 changing from a no-load condition associated with LED string 260 not conducting to a loaded condition associated with LED string 260 conducting is absorbed by controlled bleeder 220 and is substantially absent from the current of LED string 260. In another embodiment control 250 is operational to draw a time dependent amount of current via controlled bleeder 310, the sloped draw of current further reducing electromagnetic interference. Control 250 may be operational to draw a plurality of current levels through controlled bleeder 310 or an adjustable amount of current without exceeding the scope of the invention.

Figure 4B:
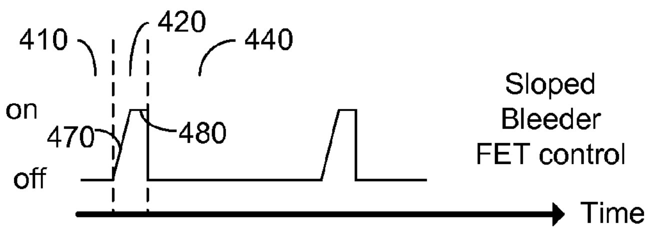
FIG. 4B illustrates an a second embodiment of the control of the bleeder of FIGS. 3A, 3B in accordance with a principle of the invention, in which the bleeder is controlled to act responsive to a sloped input.
Figure 4A:
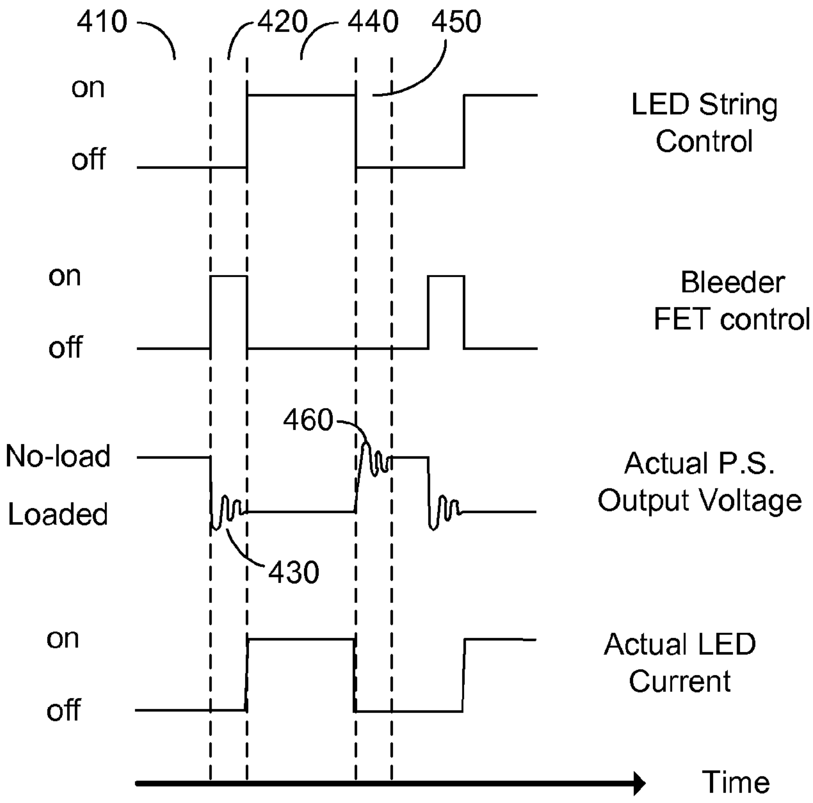
FIG. 4A illustrates the control signal for the electronically controlled switch associated with the LED string of FIGS. 3A, 3B; a first embodiment of the control output associated with the controlled bleeder of FIGS. 3A, 3B in accordance with a principle of the invention, in which the bleeder is controlled to act responsive to a step input; and the actual output voltage of the power source of FIGS. 3A, 3B and the actual LED string current of FIGS. 3A, 3B in accordance with a principle of the invention.

FIG. 4A illustrates the control signal for electronically controlled switch 270 associated with LED string 260 of FIGS. 3A, 3B; a first embodiment of the control output associated with controlled bleeder 220, 310 of FIGS. 3A, 3B respectively in accordance with a principle of the invention, in which the bleeder is controlled to act responsive to a step input; the actual output voltage of the power source of FIGS. 3A, 3B; and the actual LED string current of FIGS. 3A, 3B in accordance with a principle of the invention. The waveforms of FIG. 4A are illustrated in relation to a common x-axis representative of time, with the y-axis of each respective waveform being representative of voltage or current respectively.

During time period 410, LED string 260 is controlled by electronically controlled switch 270 so as not to conduct, and thus the output of switching power supply 210 exhibits an unloaded condition, which is typically the maximum output voltage of switching power supply 210. During time period 420, the output of control 250 associated with bleeder FET 240 is stepped to an on condition and thus current is drawn via controlled bleeder 220, 310. The power supply voltage exhibits a ringing output 430 as the power supply responds to the near instantaneous change from the no-load condition of time period 410 to the load condition of controlled bleeder 220, 310 of time period 420. Preferably time period 420 is sufficient to substantially absorb the ringing of switching power supply 210 and arrive at a steady state output.

At the beginning of time period 440 control 250 activates electronically controlled switch 270 associated with LED string 260 so as to conduct, and as a result LED string 260 draws current and the LEDs of LED string 260 illuminate. Substantially contemporaneously with the activation of electronically controlled switch 270 to draw current through LED string 260, the output of control 250 associated with bleeder FET 240 is stepped to an off condition and thus controlled bleeder 220, 310 ceases to draw current. Switching power supply 210 experiences a continued load, and thus no appreciable ringing of the output voltage is exhibited. Thus, LED string 260 experiences a steady voltage output without substantial ringing. The lack of ringing further ensures a stable current with an absence of ringing, which prolongs the life of the LEDs of the LED string, allows for a power supply which need not be sized to handle a current overshoot, and allows for sampling of the current through LED string 260 at any desired time.

There is no requirement that the current drawn by controlled bleed 220, 310 be the same as the current drawn by LED string 260, and the amount of current and length of time of operation of controlled bleeder 220, 310 is preferably sufficient to substantially absorb any ringing. Thus, time period 420 preferably begins a pre-determined time prior to time period 440, the predetermined time period being sufficient to absorb the ringing.

During time period 450, control 250 deactivates electronically controlled switch 270 associated with LED string 260 so as not to conduct, and as a result LED string 260 ceases to draw current. The voltage output of switching power supply 210 rises to the no-load value and may exhibit ringing 460. In one embodiment controlled bleeder 220, 310 is not employed to absorb ringing 460 when entering a no-load period. In another embodiment (not shown) controlled bleeder 220, 310 is employed to avoid the no-load phase or at least absorb ringing 460 associated with the turn off of LED string 260 so as to reduce electromagnetic interference.

FIG. 4B illustrates a second embodiment of the operation of controlled bleeder 220, 310 of FIGS. 3A, 3B in accordance with a principle of the invention, in which the controlled bleeder is controlled to act responsive to a sloped input. In FIG. 4B the y-axis indicates the control signal for electronically controlled switch 240 and the x-axis time. Controlled bleeder 220, 310 of FIGS. 3A and 3B respectively are controlled to act responsive to a gradual input as shown by slope 470, thereby drawing a time dependent bleed current so as to minimize the ringing of switching power supply 210. During timing period 420, which as described above in relation to FIG. 4A, begins a pre-determined time prior to time period 440 of FIG. 4A and ends substantially contemporaneously with the beginning of time period 440, control 250 activates controlled bleeder 220, 310 to gradually increase the amount of current drawn by controlled bleeder 220. During time period 440, control 250 deactivates controlled bleeder 220, 310 and no current is drawn. Thus, slope 470 acts to gradually apply a load to switching power supply 210 and thus minimize ringing. The waveform of FIG. 4B is illustrated with both a slope 470 and a steady state portion 480, however this is not meant to be limiting in any way. In one embodiment steady state portion 480 is not exhibited without exceeding the scope of the invention. In one embodiment slope 470 is implemented by an RC filter at the input to FET 240.

Figure 5:
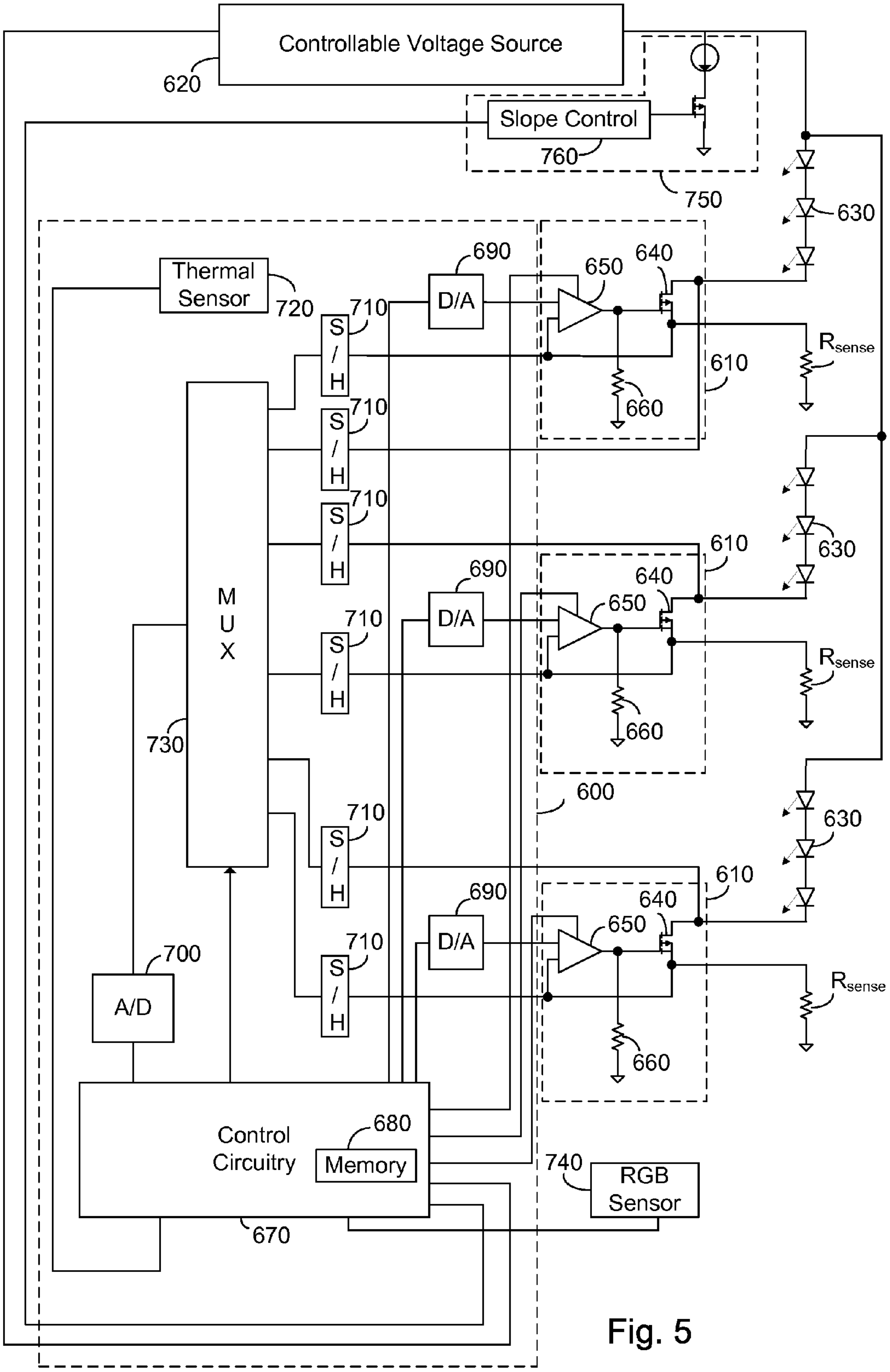
FIG. 5 illustrates a high level functional block diagram of an LED string controller, a plurality of current limiters, a controllable voltage source, a plurality of LED strings of a single color and a controlled bleeder according to a principle of the invention.

FIG. 5 illustrates a high level functional block diagram of an LED string controller 600, a plurality of current limiters 610, a plurality of LED strings of a single color 630 each exhibiting an associated sense resistor $R_{sense}$ and being associated with a respective current limiter 610, a controllable voltage source 620, an RGB sensor 740 and a controlled bleeder 750 according to a principle of the invention. Each current limiter 610 comprises an FET 640, a comparator 650 and a pull down resistor 660. LED string controller 600 comprises a control circuitry 670 comprising therein memory 680, a plurality of digital to analog (D/A) converters 690, an analog to digital (A/D) converter 700, a plurality of sample and hold (S/H) circuits 710, a thermal sensor 720 and a multiplexer 730. It is to be understood that all or part of the current limiters 610 may be constituted within LED string controller 600 without exceeding the scope of the invention.

The anode end of each LED string 630 is connected to a common positive output of controllable voltage source 620. The cathode end of each LED string 630 is connected to one end of current limiter 610 at the drain of the respective FET 640 and to an input of a respective S/H circuit 710 of LED string controller 600. The source of the respective FET 640 is connected to a first end of the respective sense resistor $R_{sense}$, and the second end of the respective $R_{sense}$ is connected to ground. The first end of the respective $R_{sense}$ is further connected to a first input of the respective comparator 650 of the respective current limiter 610 and to an input of a respective S/H circuit 710 of LED string controller 600. The gate of each FET 640 is connected to the output of the respective comparator 650 and to a first end of respective pull down resistor 660. A second end of each pull down resistor 660 is connected to ground.

A second input of each comparator 650 is connected to the output of a respective D/A converter 690 of LED string controller 600. The enable input of each comparator 650 is connected to a respective output of control circuit 670. Each D/A converter 690 is connected to a unique output of control circuitry 670, and the output of each S/H circuit 710 is connected to a respective input of multiplexer 730. The output of multiplexer 730, which is illustrated as an analog multiplexer, is connected to the input of A/D converter 700, and digitized output of A/D converter 700 is connected to a respective input of control circuitry 670. The output of thermal sensor 720 is connected to a respective input of control circuitry 670 and the output of RGB sensor 740 is connected to a respective input of control circuitry 670. The S/H circuits 710 are preferably further connected (not shown) to receive from control circuitry 670 a timing signal so as to sample during the conduction portion of the respective PWM cycle. Controlled bleeder 750 is connected across the output of controllable voltage source 620 and is arranged to be responsive to an output of control circuitry 670 via an optional slope control 760.

Controllable voltage source 620 is shown as being controlled by an output of control circuitry 670, however this is not meant to be limiting in any way. A multiplexed analog feedback loop as will be described further hereinto below may be utilized without exceeding the scope of the invention.

In operation, control circuitry 670 enables operation of each of LED strings 630 via the operation of the respective current limiter 610, and initially sets the voltage output of controllable voltage source 620 to a minimum nominal voltage and each of the current limiters 610 to a minimum current setting. The current through each of the LED strings 630 is sensed via a respective sense resistor $R_{sense}$, sampled and digitized via respective S/H circuit 710, multiplexer 730 and A/D converter 700 and fed to control circuitry 670. The voltage drop across current limiter 610 is sampled and digitized via a respective S/H circuit 710, multiplexer 730 and A/D converter 700 and fed to control circuitry 670. Control circuitry 670 controls the output of controllable voltage source 620 to minimize excess power dissipation and to compensate for aging when the PWM duty factor of respective current limiters 610 has reached a predetermined maximum.

Controlled bleeder 750 is operative as described above to limit ringing experienced in the sampling and digitizing of the voltage across the respective current limiters 610 and sense resistors $R_{sense}$. Optional slope control 760 is operative to adjustably draw current over time from controllable voltage source 720, preferably by controlling the rate of turn on of controlled bleeder 750. In one embodiment optional slope control 760 comprises a capacitor and a resistor arranged as an RC filter. In particular, control circuitry 670 is operational to draw current via controlled bleeder 750 for a predetermined time associated with the turn on and turn off of current through LED strings 630 via FET 640. In one embodiment control circuitry 670 is operational to draw current via controlled bleeder 750 for a predetermined time just prior to the turn on of one or more LED strings 630 via FET 640. Thus, ringing resulting from controllable voltage source 620 changing from a no-load condition associated with none of LED strings 630 conducting to a loaded condition associated in which one or more LED strings 630 are conducting is absorbed by controlled bleeder 750 and is substantially absent from the current of LED strings 630. In another embodiment control circuitry 670 is operational to draw a time dependent amount of current via optional slope control 760, the sloped draw of current further reducing electromagnetic interference. Control circuitry 670 may be operational to draw a plurality of current levels through controlled bleeder 750 or an adjustable amount of current without exceeding the scope of the invention.

Control circuitry 670 further sets the current limit of the LED strings 630 to a common value, via a respective D/A converter 690. In particular FET 640 responsive to comparator 650 ensures that the voltage drop across sense resistor $R_{sense}$ is equal to the output of the respective D/A converter 690. Control circuitry 670 further acts to receive the output of RGB sensor 740, and modify the PWM duty cycle of the color strings so as to maintain a predetermined white point. The PWM duty cycle is operated by the enabling and disabling of the respective comparator 650 under control of control circuitry 670.

Figure 6:
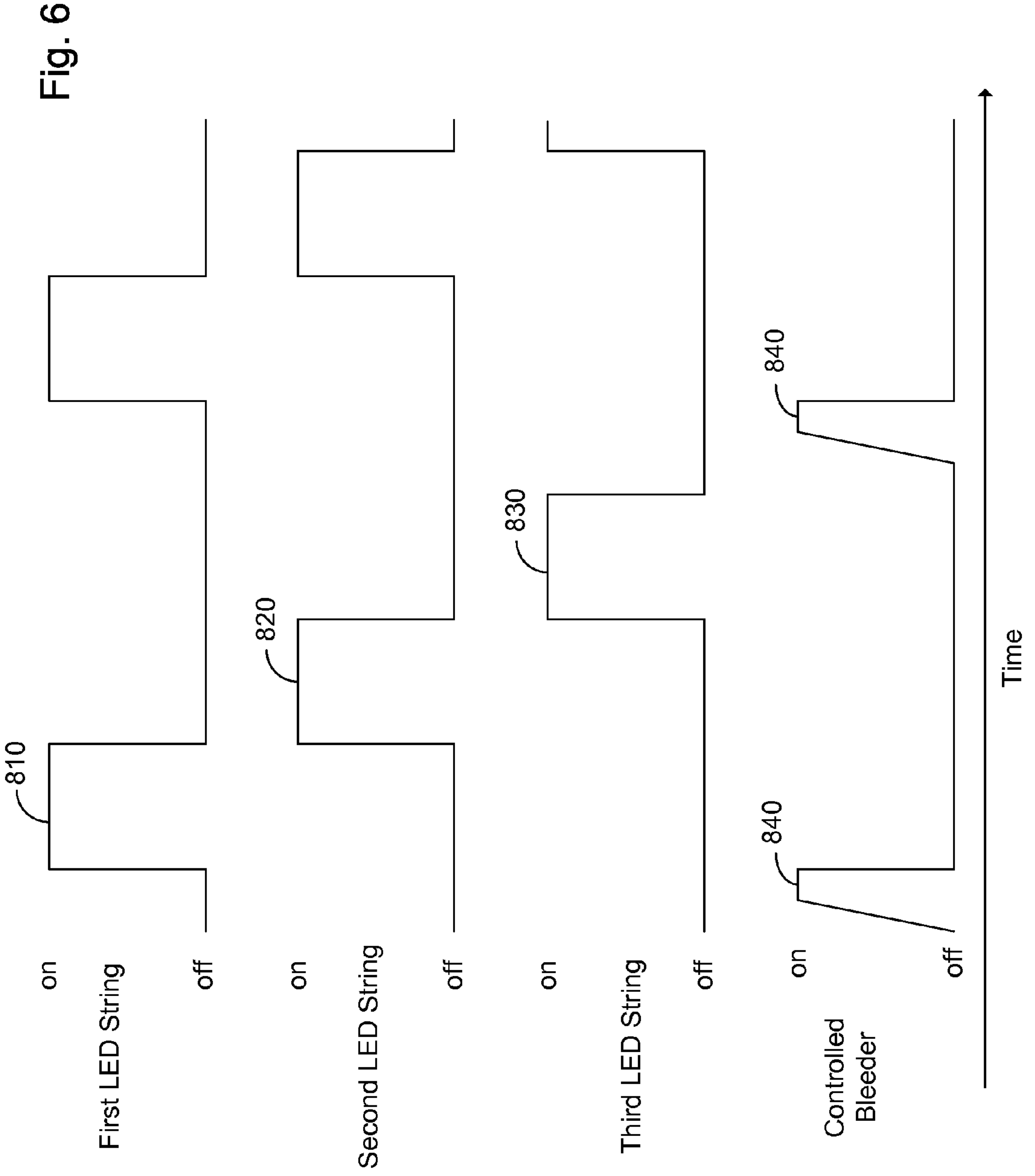
FIG. 6 illustrates a timing diagram of the enabling and disabling of each of the LED strings of FIG. 5 in accordance with the PWM control and the enabling and disabling of the controlled bleeder of FIG. 5 according to a principle of the invention.

In one embodiment, control circuitry 670 further inputs temperature information from one or more thermal sensors 720. In the event that one or more thermal sensors 720 indicate that temperature has exceeded a predetermined limit, control circuitry 670 acts to reduce power dissipation so as to avoid thermal overload FIG. 6 illustrates a timing diagram of the enabling and disabling of each of LED strings 620 of FIG. 5 in accordance with the PWM control and the enabling and disabling of controlled bleeder 750 of FIG. 5 according to a principle of the invention. The PWM control of each LED string 620 and control of controlled bleeder 750 is shown along a common time axis. First LED string 620 is pulsed for a first modulated time period 810, second LED string 620 is pulsed for a second modulated time period 820, third LED string 620 is pulsed for a third modulated time period 830 and controlled bleeder 750 is pulsed for a time period 840. In a preferred embodiment the first modulated time period 810, second modulated time period 820 and third modulated time period are staggered so as to present at least one load to controllable voltage source 620 for a maximal time period. Controlled bleeder time period 840 is utilized only when the PWM control of first through third LED string 620 does not allow for at least one LED string to be on at all time periods, and is thus utilized to absorb ringing just prior to first modulated time period 810. Controlled bleeder 750 is illustrated with an optional slope control, however this is not meant to be limiting in any way. Controlled bleeder 750 is illustrated as allowing a time period in which no current is drawn by any of first, second and third LED string 620 and begins drawing current a pre-determined time period prior to conduction, however this is not meant to be limiting in any way. In another embodiment controlled bleeder 750 is operational to draw current whenever no current is drawn by any of first, second and third LED string 620.

Figure 7:
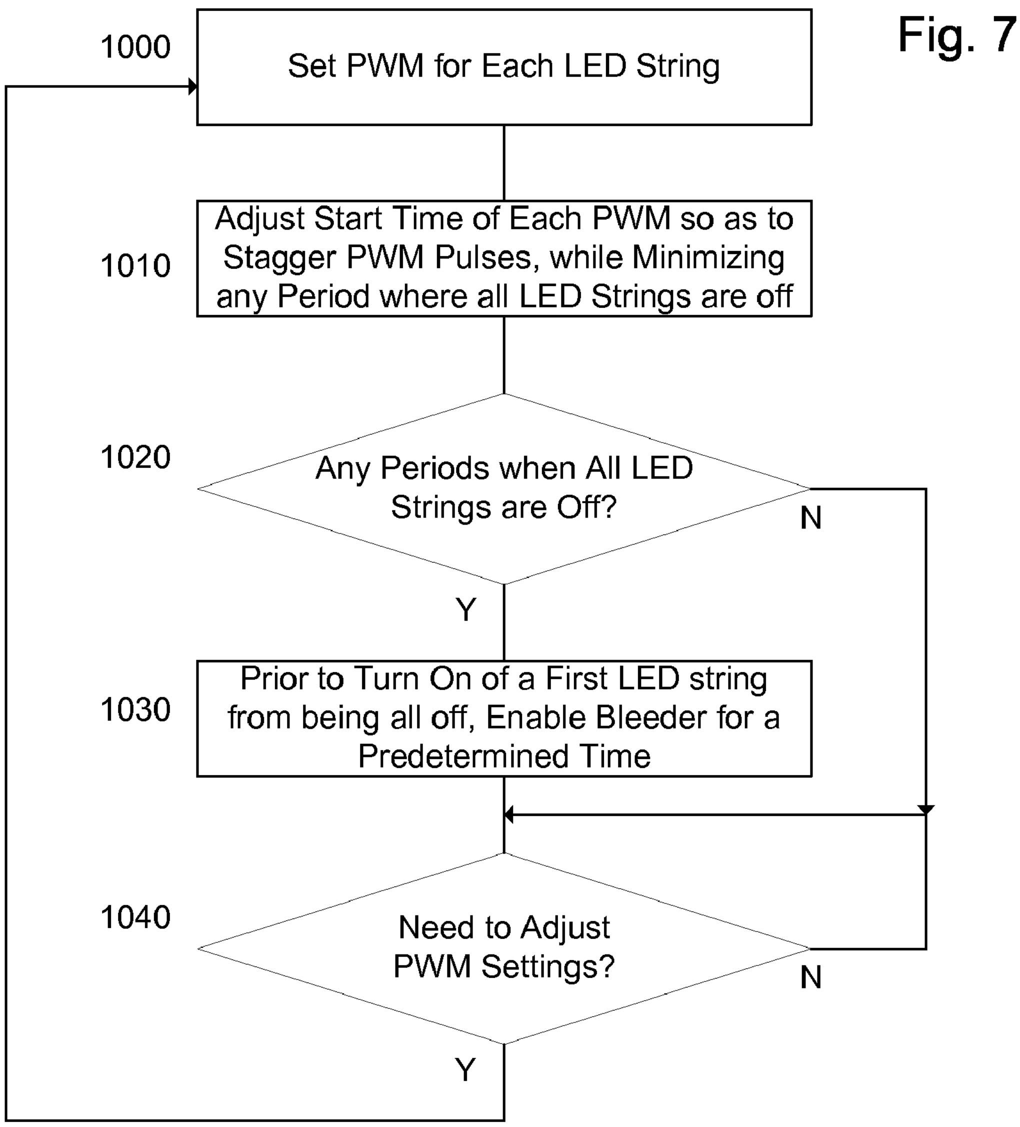
FIG. 7 illustrates a high level flow chart of the operation of control circuitry of FIG. 5 to stagger the pulses enabling each of the LED strings and to enable and disable the controlled bleeder according to a principle of the invention.

FIG. 7 illustrates a high level flow chart of the operation of control circuitry of FIG. 5 to stagger the pulses enabling each of the LED strings and to enable and disable the controlled bleeder according to a principle of the invention. In stage 1000 the PWM for each LED string 620 is set. In one embodiment the initial setting is based on values stored in memory 680 of FIG. 5. In stage 1010 the start time of each PWM pulse is adjusted so as to stagger the PWM pulses over the cycle time. In an exemplary embodiment the staggering comprises ensuring that no two pulses begin at the same time, and also that any period when none of the LED strings 620 are enabled is minimized. Further preferably only a single period when none of the LED strings 620 are enabled occurs per cycle.

In stage 1020 the adjustment of stage 1010 is analyzed to determine whether any period exists in which none of the LED strings 620 are enabled. In the event that in stage 1020 a period is determined in which none of the LED strings 620 are enabled, in stage 1030 prior to the enabling of a first LED string 620 from the period in which none of the LED strings 620 are enabled, controlled bleeder 750 is enabled for a predetermined period of time so as to minimize ringing experienced by the LED strings 620.

In stage 1040 the system is monitored to determine if any adjustment in PWM cycle is required. In one embodiment adjustment is required responsive to an input form RGB color sensor 740. In the event that PWM adjustment is not required stage 1040 is repeated. In the event PWM adjustment is required, stage 1000 as described above is again performed.

In the event that in stage 1020 no period is determined in which none of the LED strings 620 are enabled, stage 1040 as described above is performed.

Thus, the routine of FIG. 7 is operative to stagger the PWM pulses, and in the event a period with no current draw will occur, to enable the controlled bleeder in advance of a change from a no current mode to a current draw mode.

Thus the present embodiments enable a controlled bleeder associated with each power source. In one embodiment the controlled bleeder comprises an impedance arranged to be controllably switched to present a load to the power source, and in an other embodiment the controlled bleeder comprises a current source arranged to be controllably draw a pre-selected current from the power source. The controlled bleeder is switched to draw current just prior to enabling one or more LED strings so as to absorb and ringing from the power supply. Thus, the LED strings experience more stable power when connected to draw power.

In one embodiment the controlled bleeder is switched to draw current only when none of the connected LED strings are enabled, and only for a predetermined time period just prior to enabling one or more LED strings. In another embodiment the controlled bleeder is switched to draw current just prior to enabling a at least one LED string. Preferably the controlled bleeder is switched to not draw current contemporaneously with the at least one LED string being enabled.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. An LED backlighting system comprising:

a control circuit;

a power source;

at least one LED string associated with said power source, said at least one LED string being arranged to be switchably connected to alternatively draw current from said power source and not draw current from said power source; and a controlled bleeder arranged to draw a bleed current from said power source responsive to said control circuit, said bleed current not flowing through said at least one LED string;

said control circuit operative to draw said bleed current from said power source via said controlled bleeder for a predetermined time period when said at least one LED string is not switchably connected to draw current from said power source.

2. An LED backlighting system according to claim 1, wherein predetermined time period ends substantially contemporaneously with said at least one LED string being switchably connected to draw current from said power source.

3. An LED backlighting system according to claim 1, wherein said control circuit is operative, responsive to an output of said power source indicative of an unstable output, to draw said bleed current.

4. LED backlighting system according to claim 1, wherein said controlled bleeder comprises one of an impedance and a current source.

5. An LED backlighting system according to claim 1, wherein said control circuit is further operative to not draw said bleed current whenever said at least one LED string is switchably connected to draw current from said power source.

6. An LED backlighting system according to claim 1, wherein said controlled bleeder is arranged to draw one of a plurality of pre-determined levels of bleed current from said power source.

7. An LED backlighting system according to claim 1, wherein said controlled bleeder is arranged to draw an adjustable amount of bleed current from said power source.

8. An LED backlighting system according to claim 1, wherein said controlled bleeder is arranged to draw a predetermined bleed current from said power source.

9. An LED backlighting system according to claim 1, wherein said control circuit is operative to draw a time dependent amount of bleed current, and wherein said time dependent amount of bleed current is operative to reduce electromagnetic interference.

10. An LED backlighting system according to claim 1, wherein said control circuit is operative to draw said bleed current prior to said at least one LED string being switchably connected to draw current, wherein said drawn bleed current reduces ringing experienced by said at least one LED string.

11. An LED backlighting system according to claim 1, wherein said at least one LED string comprises a plurality of LED strings, and wherein each of said plurality of LED strings is switchably connected responsive to said control circuit, said control circuit being operative to draw said bleed current when none of said plurality of LED strings are switchably connected to draw current.

12. An LED backlighting system according to claim 11, wherein said control circuit is further operative to disable said bleed current whenever at least one of said plurality of LED strings is switchably connected to draw current.

13. An LED backlighting system according to claim 11, wherein said pre-determined time period is just prior to at least one of said plurality of LED strings being switchably connected to draw current, said pre-determined time period being sufficient to absorb ringing.

14. An LED backlighting system according to claim 1, wherein said control circuit is operative to adjustably draw said bleed current, said pre-determined time period being prior to said at least one LED string being switchably connected to draw current, said pre-determined time period being sufficient to absorb ringing.

15. A method for LED backlighting comprising:

providing a power source;

providing at least one LED string associated with said power source;

alternatively drawing current from said power source via said provided at least one LED string and not drawing current from said power source via said provided at least one LED string; and drawing a bleed current from said power source for a pre-determined time period when said provided at least one LED string is not drawing current from said power source, said drawn bleed current not flowing through said provided at least one LED string.

16. A method according to claim 15, wherein said predetermined time period ends substantially contemporaneously with said at least one LED string drawing current from said power source.

17. A method according to claim 15, further comprising:

outputting a signal from said power source indicative of an unstable output, wherein said drawing a bleed current is responsive to said output signal.

18. A method according to claim 15, further comprising providing one of an impedance and a current source, said drawing a bleed current being associated with said provided one of an impedance and a current source.

19. A method according to claim 15, further comprising:

not drawing said bleed current whenever said provided at least one LED string is drawing current from said power source.

20. A method according to claim 15, wherein said bleed current is selected from a plurality of pre-determined levels of current.

21. A method according to claim 15, wherein said bleed current is of an adjustable amount.

22. A method according to claim 15, wherein said bleed current is a pre-determined amount of current.

23. A method according to claim 15, wherein said bleed current is of a time adjustable amount, said time adjustable amount reducing electromagnetic interference.

24. A method according to claim 15, wherein said drawing of said bleed current is just prior to said drawing current from said power source via said provided at least one LED string, and wherein said bleed current reduces ringing of said drawn current.

25. A method according to claim 15, wherein said provided at least one LED string comprises a plurality of LED strings, and wherein said drawing said bleed current is at least partially contemporaneous with none of said provided plurality of LED strings drawing current from said power source.

26. A method according to claim 15, wherein said drawing of said bleed current is for a pre-determined time period prior to said drawing current via said provided at least one LED string, said pre-determined time period being sufficient to absorb ringing.

27. A method according to claim 15, wherein said provided at least one LED string comprises a plurality of LED strings, wherein said drawing of said bleed current is at least partially contemporaneous with none of said provided plurality of LED strings being drawing current from said power source, and wherein said drawing said bleed current is for a pre-determined time period prior to at least one of said provided plurality of LED strings drawing current, said pre-determined time period being sufficient to absorb ringing.

28. An LED backlighting system comprising:

a control circuit;

a power source;

at least one LED string coupled to the output of said power source, said at least one LED string being arranged to be switchably connected to alternatively draw an illumination current from said power source and not draw an illumination current from said power source; and a means for controlled bleeding of current from said power source responsive to said control circuit;

said control circuit operative to draw a bleed current from said power source via said means for controlled bleeding when said at least one LED string is not drawing said illumination current from said power source, said drawn bleed current not flowing through said at least one LED string.

* * * * *